(12) United States Patent
Dharampurikar et al.

(10) Patent No.: US 12,341,657 B2
(45) Date of Patent: Jun. 24, 2025

(54) AUTOMATING PROVISIONING OF CONFIGURATION TEMPLATES

(71) Applicant: Rakuten Symphony, Inc., Tokyo (JP)

(72) Inventors: Aaditya Dharampurikar, Indore (IN); Rahul Gupta, Indore (IN); Abhishek Singh, San Mateo, CA (US); Biplav Kumar, Tokyo (JP); Ashutosh Das, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/043,043

(22) PCT Filed: Jan. 6, 2023

(86) PCT No.: PCT/US2023/010269
§ 371 (c)(1),
(2) Date: Feb. 27, 2023

(87) PCT Pub. No.: WO2024/147791
PCT Pub. Date: Jul. 11, 2024

(65) Prior Publication Data
US 2024/0430163 A1 Dec. 26, 2024

(51) Int. Cl.
*H04L 41/084* (2022.01)
*H04L 41/08* (2022.01)
*H04L 41/0806* (2022.01)
*H04L 41/22* (2022.01)

(52) U.S. Cl.
CPC ...... *H04L 41/0843* (2013.01); *H04L 41/0806* (2013.01); *H04L 41/0879* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 6,601,233 B1* | 7/2003 | Underwood | | G06F 8/24 |
| | | | | 717/102 |
| 6,633,878 B1* | 10/2003 | Underwood | | G06Q 10/10 |
| | | | | 707/999.102 |
| 8,595,810 B1* | 11/2013 | Ben Ayed | | H04L 63/0815 |
| | | | | 713/168 |
| 9,037,716 B2* | 5/2015 | Kuo | | G06F 17/00 |
| | | | | 718/100 |

(Continued)

*Primary Examiner* — Ranodhi Serrao
(74) *Attorney, Agent, or Firm* — HAUPTMAN HAM, LLP

(57) ABSTRACT

Provisioning of day-1 configuration templates is automated. Users are provided access to a Configuration Template User Interface (UI) for creating configuration templates. Input is received on the Configuration Template UI to create the configuration templates. A trigger is received by a configuration manager to initiate configuration of network devices or functions. The trigger includes one or more Template Identifiers (IDs) corresponding to the one or more configuration templates. Configuration files are generated based on the trigger and one or more Template IDs corresponding to the one or more configuration templates. Configuration files are sent from the configuration manager to the one or more network devices or functions to configure the one or more network devices or functions.

17 Claims, 9 Drawing Sheets

(56) References Cited

U.S. PATENT DOCUMENTS

| | | | | |
|---|---|---|---|---|
| 2002/0083343 A1* | 6/2002 | Crosbie | ............... | G06F 21/552 |
| | | | | 709/224 |
| 2002/0129024 A1* | 9/2002 | Lee | ..................... | G06F 21/41 |
| 2002/0138543 A1* | 9/2002 | Teng | ................... | G06Q 10/06 |
| | | | | 707/E17.005 |
| 2002/0152254 A1* | 10/2002 | Teng | ................... | G06Q 10/10 |
| | | | | 718/100 |
| 2004/0022379 A1* | 2/2004 | Klos | ................. | H04M 15/90 |
| | | | | 379/201.12 |
| 2011/0047274 A1* | 2/2011 | Kuo | ................. | H04L 41/5019 |
| | | | | 706/47 |
| 2022/0166679 A1* | 5/2022 | Hafeez | ............... | H04L 41/145 |
| 2024/0184980 A1* | 6/2024 | Luthra | ................. | G06F 9/542 |

\* cited by examiner

AUTOMATING PROVISIONING OF CONFIGURATION TEMPLATES

RELATED APPLICATIONS

The present application is a National Phase of International Application No. PCT/US2023/010269, filed Jan. 6, 2023.

TECHNICAL FIELD

This description relates to automating provisioning of day-1 configuration templates, and method of using the same.

BACKGROUND

Traditional mobile networks are built relying on a diversity of hardware devices designed and manufactured by different vendors. Complex and static planning and provisioning from the perspective of the service and the network is performed to re-configure the network, tailor topologies and capacity, and to introduce new services in the network. Current mobile networks are also to be adapted to 5G services and demands. Carrier networks are structured across regional, national and global infrastructures. Configuring a mobile network also includes managing and controlling a large number of Network Elements (NEs) and Network Functions (NFs) distributed over a multitude of locations, various domains, etc.

Configuration and orchestration is used to provide a flexible mapping of services to topologies of NFs, based on a dynamic allocation of resources to NFs and the reconfiguration of NFs according to changing service demands. Configuring a mobile communication network is not a flexible operation, so configuration operations, such as adding or modifying a function, scaling a resource up/down, and effectively implementing various service requirements, are difficult.

Currently, configuring a mobile network is a multistep process that, in response to a changes to the configuration, involves a user manually making the changes. For example, after device instantiation, a user triggers a Day-1 Configuration push using a Network Orchestrator. The trigger is sent from the Network Orchestrator to a Configuration Manager. The trigger includes details for dynamic configuration parameter. On receiving the trigger, Configuration Manager generates configuration for network devices and functions using backend algorithms. The generation of the configuration for network devices and functions involves generating jars from data model files, and using the x-path details and the telecom library of static parameter detail and the dynamic parameter details from the trigger. In response to specific changes being made to the configuration, the user manually enters or edits the configuration information. Then, the configuration is pushed to the network device or function. The process is repeated for different sets of configurations for devices that belong to the same family.

A mechanism for the vendor or user to use automated provisioning of configurations does not exist. Thus, for one software version, the user has one configuration file available for use by the user. In response to implementing a configuration at different network levels, the user manually modifies relevant configurable parameters before actually implementing the configuration in the real network. For the same software version, the user has a configuration set available with a specific set of configuration values assigned to the parameters. However, in the network, the static parameter are not constant throughout the network, and are able to vary by geography, network level, and many other aspects. Accordingly, the user manually changes the relevant parameters before implementing a configuration on the network. Support for maintaining different configuration sets for a software version is also not available.

SUMMARY

In at least embodiment, a method for automating provisioning of day-1 configuration templates includes providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

In at least one embodiment, a configuration manager, includes a memory storing computer-readable instructions, and a processor connected to the memory, wherein the processor is configured to execute the computer-readable instructions to perform operations including providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

In at least one embodiment, non-transitory computer-readable media having computer-readable instructions stored thereon, which when executed by a processor causes the processor to perform operations including providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
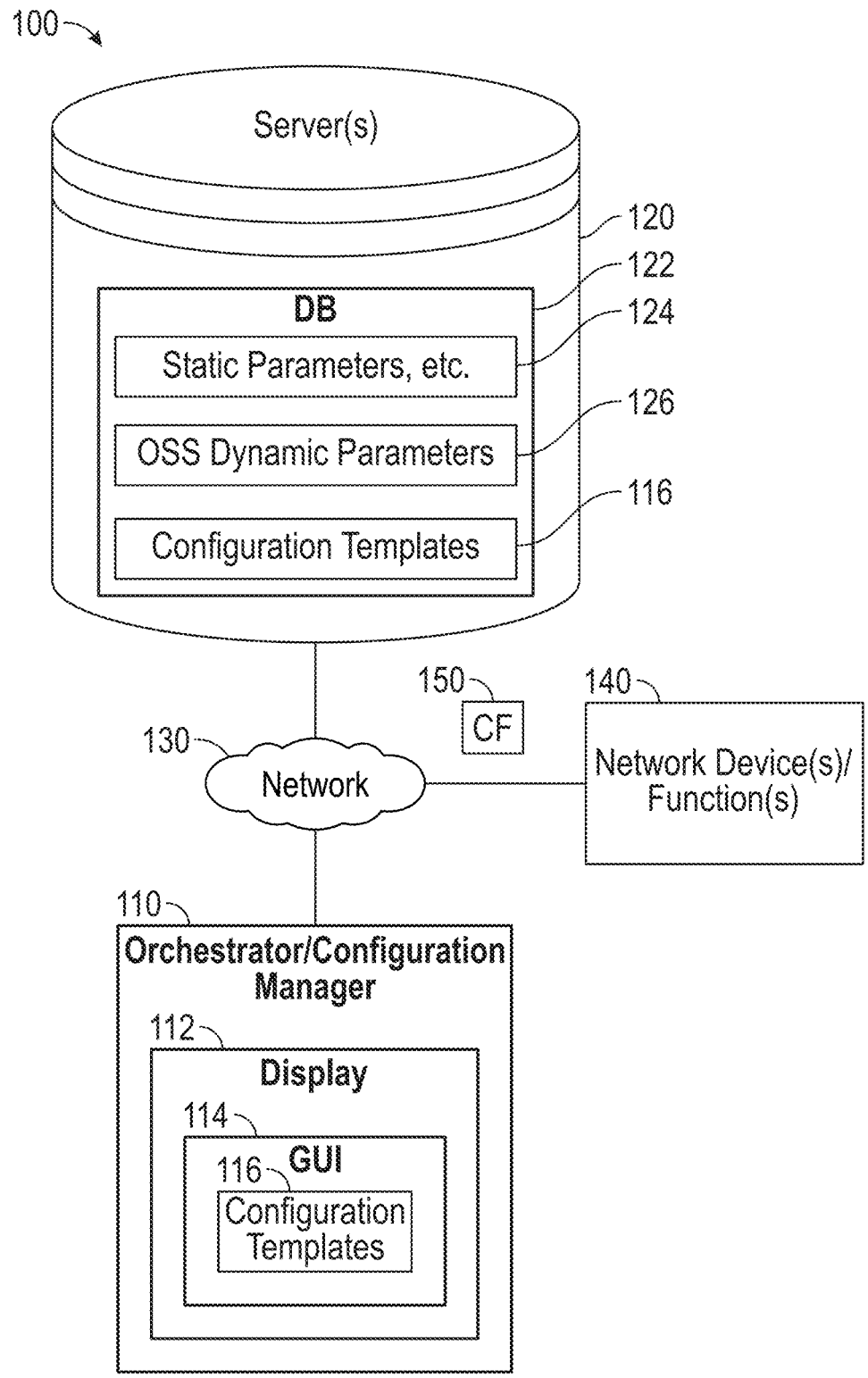
FIG. 1 illustrate a system for automating provisioning of Day-1 Configuration Templates according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or a data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or a data-stream or signaling-stream from UE.

In at least one embodiment, a method for automating provisioning of day-1 configuration templates includes providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

Embodiments described herein provide method that provides one or more advantages. For example, the manual effort of updating the parameter values is eliminated. Manually provisioning Day 1 configuration templates is highly tedious and prone to human error. Time and money are also saved. Automating provisioning of Day 1 configuration templates also saves time and money because the configuration flow is not interrupted and is more efficient.

FIG. 1 illustrate a system 100 for automating provisioning of Day-1 Configuration Templates according to at least one embodiment.

In FIG. 1, an Orchestrator/Configuration Manager 110 is provided. Orchestrator/Configuration Manager 110 includes a Display 112 and presents a Graphical User Interface (GUI) 114 that enables a user to create and identify configuration templates for automated provisioning of network devices and functions. The Orchestrator/Configuration Manager 110 provides a GUI 114 via Display 112, allows a user to create and maintain different Configuration Templates 116 per Domain, Vendor, Technology, Software Version, and Element Type. In at least one embodiment, fewer, additional, of different aspects are able to be used to define the Configuration Templates 116. Configuration templates are created and selected for automated provisioning through GUI 114 accessible via Display 112 and saved to Database (DB) 122 at Server(s) 120 by Orchestrator/Configuration Manager 110 via Network 130.

The user, from the GUI 114, is able to edit, delete, clone, and provision Configuration Templates 116. GUI 114 shows a Templates Preview that includes the parameter details, including any changes implemented to Configuration Templates 114. Orchestrator/Configuration Manager 110 generates configurations differently for different Configuration Templates 114, wherein different Configuration Templates 114 vary by selected parameters that are created in a new configuration template or by editing values initially set in an existing configuration template. Some or all parameters are able to be changed.

A Configuration Templates 114 is associated with a template ID generated by Orchestrator/Configuration Manager 110 that is used as an identifier for the specific configuration. Orchestrator/Configuration Manager 110 and Configuration Templates 116 work with any supported Northbound Entity used for commissioning configuration tasks. Orchestrator/Configuration Manager 110 accesses Database (DB) 122 obtain Static Parameters 124. DB 122 also maintains the Configuration Templates 116. A trigger is provided to Orchestrator/Configuration Manager 110 that includes the OSS/Dynamic Parameters 126. The OSS/Dynamic Parameters 126 are also capable of being stored at DB 122. The Orchestrator/Configuration Manager 110 then generates a Configuration File 150 that is pushed to Network Elements (NEs)/Network Functions (NFs) 140. Orchestrator/Configuration Manager 110 download reports from Network Elements (NEs)/Network Functions (NFs) 140 that are presented via GUI 114.

In at least one embodiment, the Orchestrator/Configuration Manager 110 is implemented in a standalone system. In at least one embodiment, Orchestrator/Configuration Manager 110 is implemented using a distributed computing model that allows two or more distributed or co-located computing devices to coordinate their activities in order to achieve automation of provisioning of Configuration Templates 116 according to at least one embodiment. Orchestrator/Configuration Manager 110 is able to be implemented using a separate Orchestrator and Configuration Manger. Coordination occurs via a network (e.g., a local area network, a wide area network, and/or the Internet) or some other form of communicative coupling. With the continued reduction in costs of computer storage (e.g., random access memory, solid state memory, and hard drives) and always-on, networking computing devices (e.g., personal computers (PCs), laptops, tablet devices, and cell phones), new techniques can be employed to take advantage of distributed computing systems.

In particular, cloud-based computing is a term that can refer to distributed computing architectures in which the data and program logic for a cloud-based application are shared between one or more client devices and server devices on a near real-time basis. Parts of this data and program logic may be dynamically delivered to various clients accessing the cloud-based application. For example, Server(s) 120 are capable of storing data and program logic for implementing the automation of provisioning of Configuration Templates 116 in a cloud-based computing architecture. Details of the architecture may be transparent to the users of client devices. Thus, a PC user accessing a cloud-based application may not be aware that the PC downloads program logic and/or data from the server devices, or that the PC offloads processing or storage functions to the server devices.

Figure 2:
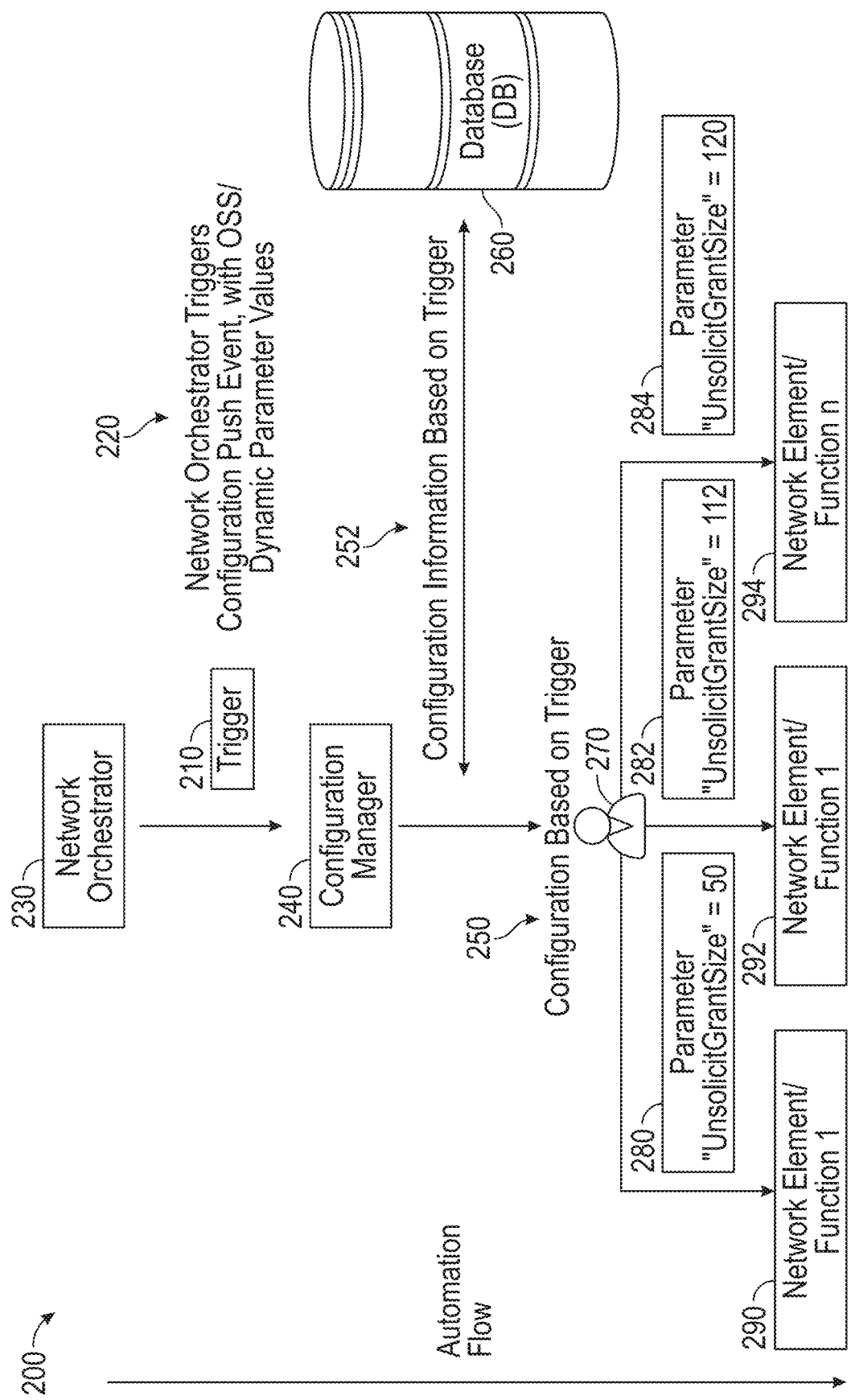
FIG. 2 illustrates an automation flow for configuration using manual creation and editing of configuration.

FIG. 2 illustrates an automation flow 200 for configuration using manual creation and editing of configuration.

In FIG. 2, after device instantiation, a user initiates a Trigger 210 for a Day-1 Configuration push event 220 using a Network Orchestrator 230. The Trigger 210 from the Network Orchestrator includes OSS/Dynamic Parameter Values. The Trigger 210 is sent from the Network Orchestrator 230 to Configuration Manager 240. On receiving the Trigger 210, Configuration Manager 240 generates Configuration 250 based on the Trigger 210 for network devices and functions using backend algorithms and Configuration Information 252 obtained from a Database (DB) 260. The generation of the Configuration 250 for network devices and functions involves generating jars from data model files, and using the x-path details and the telecom library of static parameter details obtained from DB 260 and the dynamic parameter details from the Trigger 210. In response to specific changes being made to the Configuration 250, a user 270 manually enters or edits the configuration information, e.g., Parameters 280, 282, 284. For example, first Parameter 280 is "unsolicitGrantSize"=50, second Parameter 282 is "unsolicitGrantSize"=112, and nth Parameter 284 is "unsolicitGrantSize"=120. Then, the configuration is pushed to the Network Element (Device) or Function 290, 292, 294. The process is repeated for different sets of configurations for devices/functions that belong to the same family.

Figure 3:
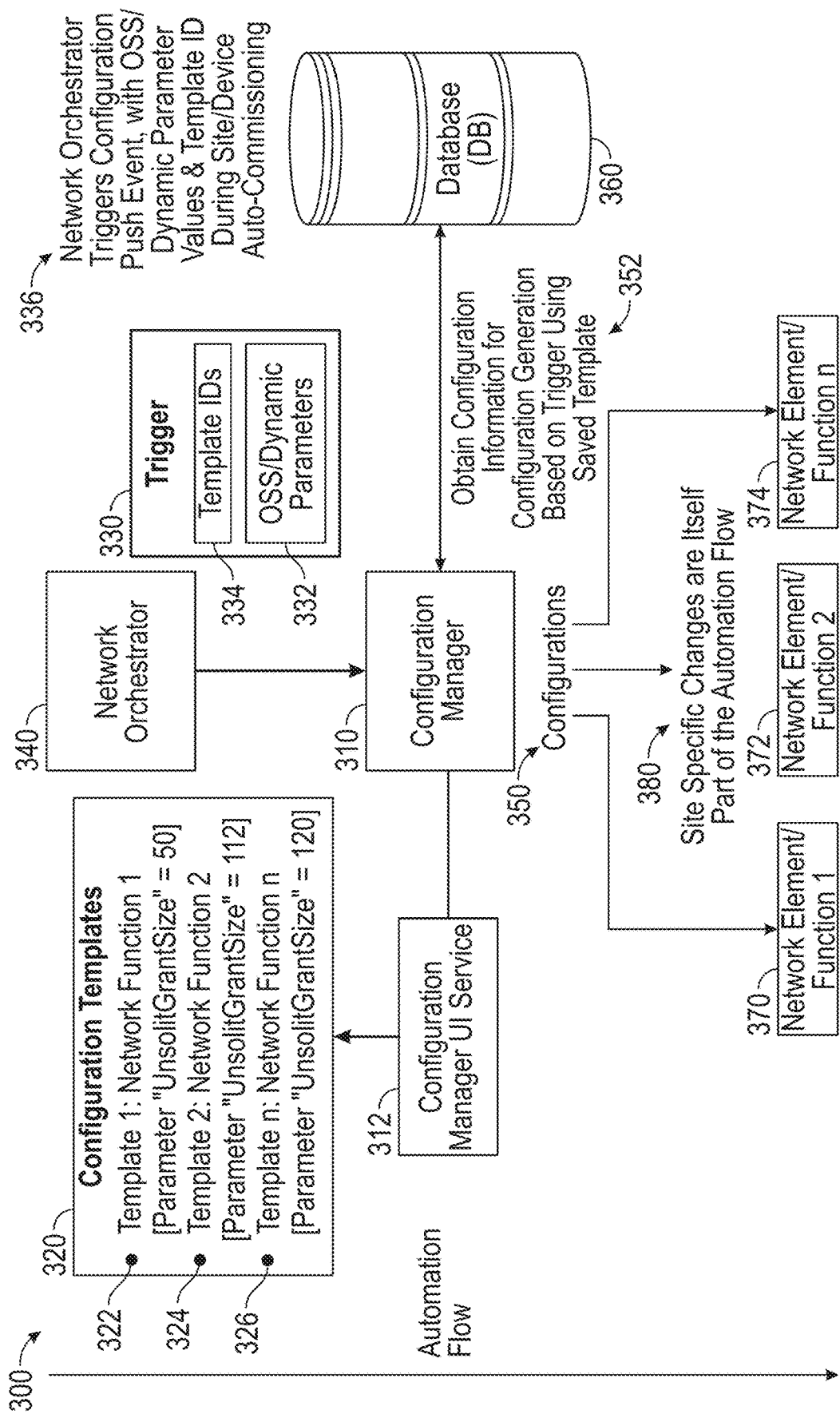
FIG. 3 illustrates an automation flow for automating provisioning of Day-1 Configuration Templates according to at least one embodiment.

FIG. 3 illustrates an automation flow 300 for automating provisioning of Day-1 Configuration Templates according to at least one embodiment.

In FIG. 3, a user access a Configuration Manager UI Service 312 of Configuration Manager 310 to create one or more Configuration Templates 320, which include user-defined values. For example, Configuration Templates 320 include Template 1: Network Function 1 [Parameter "unsolitGrantSize"=50] 322, Template 2: Network Function 2 [Parameter "unsolitGrantSize"=112] 324, and Template n: Network Function n [Parameter "unsolitGrantSize"=120] 326. A user creates the Configuration Templates 320 before the commissioning is initiated and saves the Configuration Templates 320 in Database (DB) 360.

A Trigger 330 is issued by a Northbound Entity, e.g., Network Orchestrator 340, for any commissioning side provisioning. Trigger 330 from Network Orchestrator 340 provides OSS/Dynamic Parameter Values 332 and Template IDs 334 included in the Trigger 340 to initiate a configuration push event 336 based on. Configuration Manager 310 obtains Configuration Information 352 for configuration generation based on the Trigger 330 using saved Configuration Templates 330 in DB 360. Once Configuration Manager 310 receives Trigger 330, including the Template IDs 334, Configuration Manager 310 generates Configuration 350, e.g., JAR (Java ARchive) files along with XML (extensible Markup Language) and JavaScript Object Notation (JSON) files from data model files that are obtained in the telecom library in DB 360 using the x-path details, and the baseline values that are in the Configuration Templates 330 identified by the Template IDs 334, plus the OSS/dynamic parameters that are provided by the trigger itself.

The Configuration Templates 330 are used directly by the Configuration Manager 310 to generate a Configuration 350. The Network Orchestrator 340 uses first Template IDs 334, e.g., identifying Template 1 322, to tell Configuration Manager 310 that a particular configuration is to be used for a first set of devices. A second Template IDs 334, e.g., identifying Template 2 324, to tell Configuration Manager 310 that a particular configuration is to be used for a second set of devices. The parameters set by the Configuration Templates 320 are able to be based on the geography, on the level of services, on the type of device, etc. Configuration Manager 310 exposes the Template IDs 334 to known entities.

Configurations 350 are pushed to Network Element/Function 1 370, Network Element/Function 2 372, and Network Element/Function n 374. The user does not perform any manual intervention and provisioning of Day-1 Configuration Templates 320 is automated in the end-to-end flow. The user simply creates Configuration Templates 320 prior to Trigger 330 being sent to Configuration Manager 310. The site specific changes are part of the automation flow 380.

Configuration Templates 320 are also able to be used to create a UI snapshot. Configuration Templates 320 include information, such as Status, Name, Template ID, Vendor, Domain, Software Version, Template Type, and Technology. In at least one embodiment, fewer, additional, of different aspects or categorizations are able to be used to define the Configuration Templates 116. Configuration Templates 320 are exposed to Northbound Entities based on the different categorizations.

Figure 4:
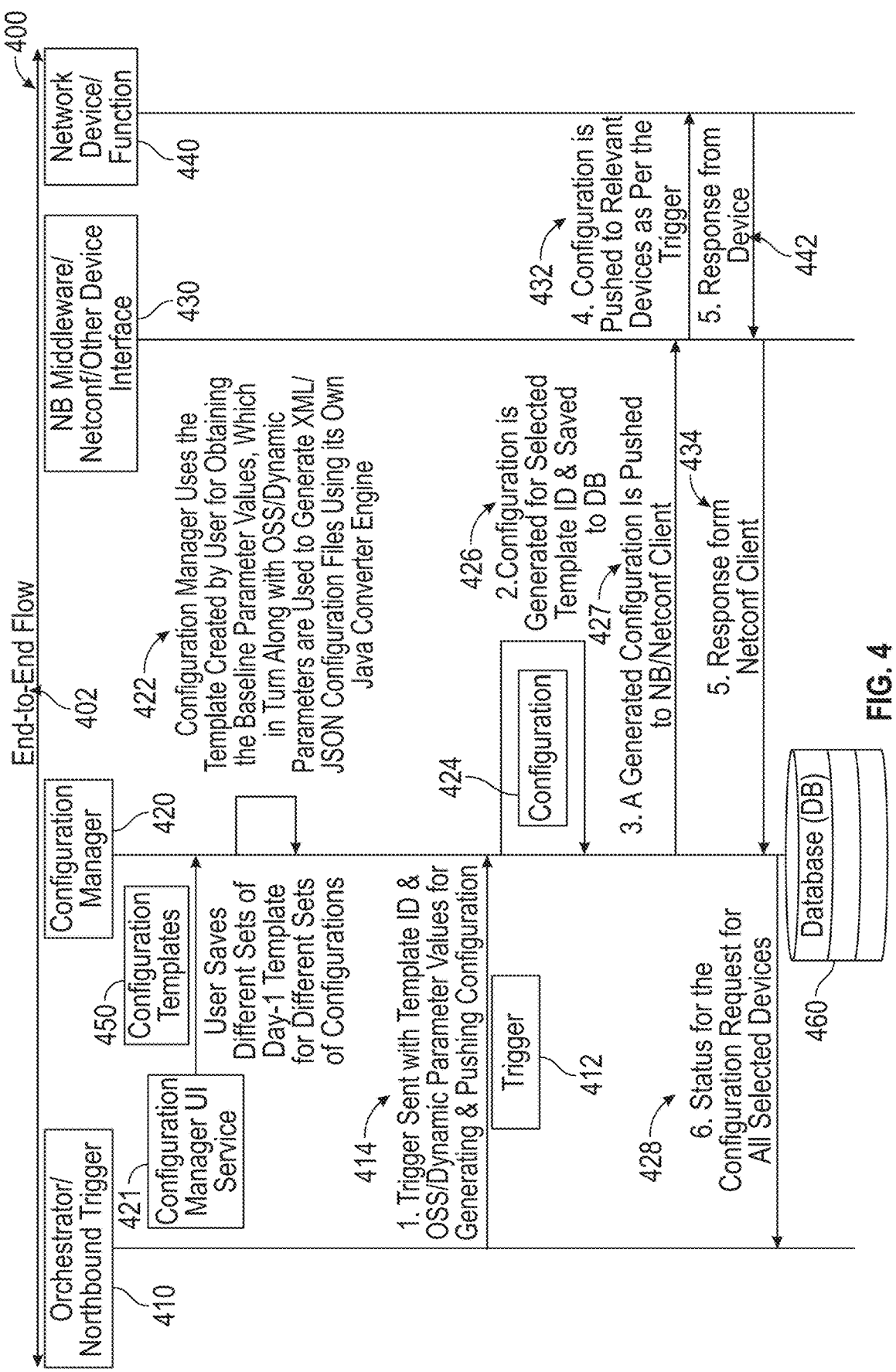
FIG. 4 is an End to End Flow Diagram of the method for automating provisioning of Day-1 Configuration Templates according to at least one embodiment.

FIG. 4 is an End to End Flow Diagram 400 of the method for automating provisioning of Day-1 Configuration Templates according to at least one embodiment.

In FIG. 4, End-to-End Flow 402 occurs between Orchestrator 410, Configuration Manager 420, Northbound (NB) Middleware/Netconf/Other Device Interface Entity 430, and Network Devices/Functions 440. A user initially accesses Configuration Manager UI Service 421 from Configuration Manager 420 to create and then save Configuration Templates 450 to Database (DB) 460. User saves different sets of Day-1 Configuration Templates 450 for different sets of configurations.

Orchestrator 410 sends a Trigger 412 to Configuration Manager 420. Trigger 412 is sent with at least one Template ID and OSS/Dynamic Parameter Values for generating and pushing a configuration 414. In response to the template being saved, Configuration Manager 420, on the backend, creates JARs and other configuration files.

Once the Trigger 412 and details are received from the Orchestrator 410, Configuration Manager 420 uses the Configuration Templates 450 created by user for obtaining the Baseline Parameter Values, which in turn along with OSS/Dynamic Parameters are used to generate XML/JSON configuration files using its own Java Converter Engine 422. The Configuration Manager 420 already has a fixed baseline set of values that are added to the configuration. Once Configuration Manager 420 receive the trigger with OSS details and Template ID(s), Configuration Manager 420 generates Configuration 424 using the one or more specific Configuration Template IDs 426, which are saved to DB 460.

The OSS/dynamic parameter are applied to that Configuration 424, and Configuration Manager 420 pushes the generated configuration to NB/Netconf 427. NB/Netconf 430 pushes the configuration to relevant devices 432 according to the Trigger 412. Status is returned 442 from the Network Devices/Functions 440 to the NB/Netconf 430. NB/Netconf 430 returns a response 434 to the Configuration Manager 420. Configuration Manager 420 returns status for the configuration request for devices 428.

Figure 5:
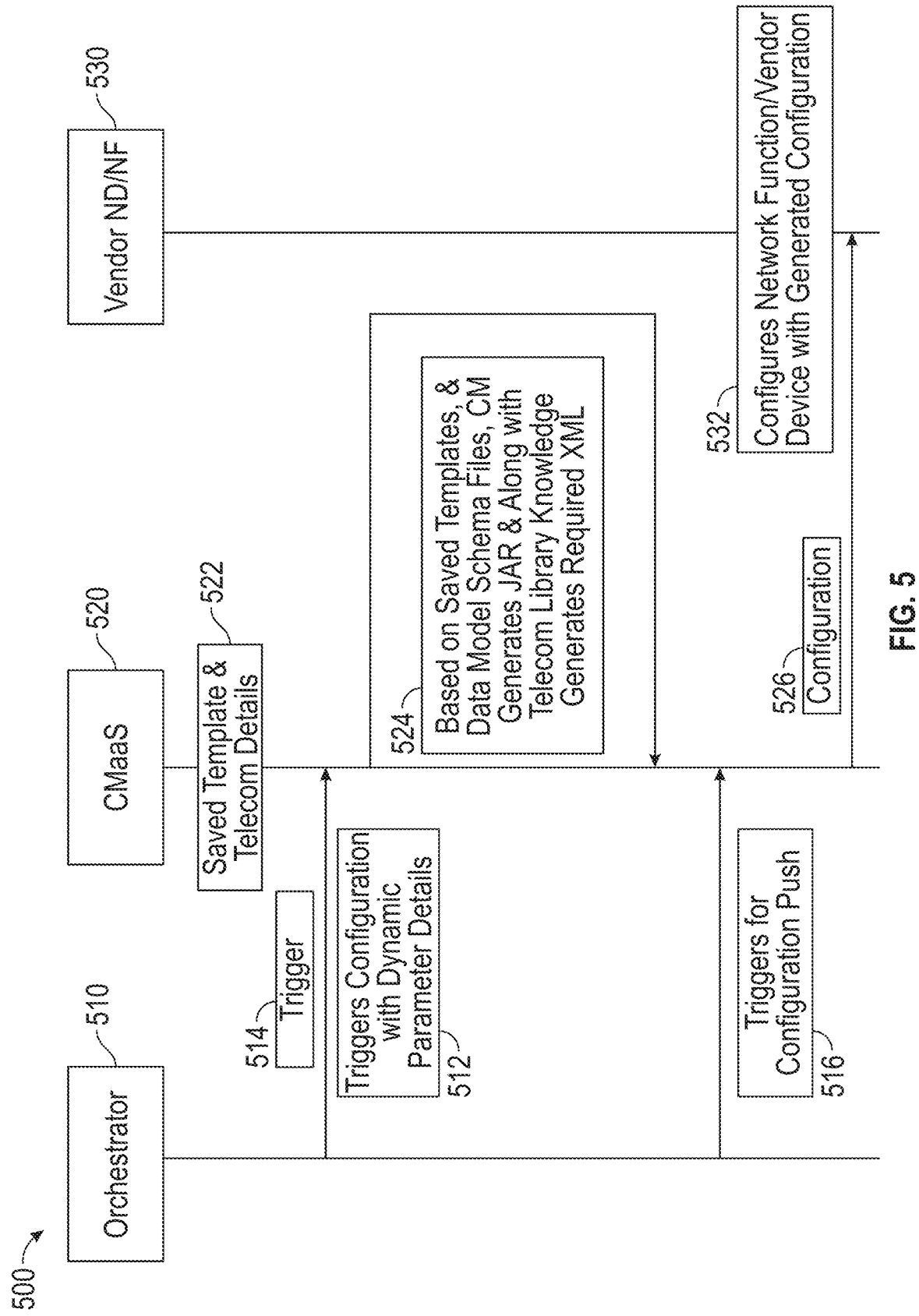
FIG. 5 is a Configuration Generation Flow based on automated provisioning of Day-1 Configuration Templates according to at least one embodiment.

FIG. 5 is a Configuration Generation Flow 500 based on automated provisioning of Day-1 Configuration Templates according to at least one embodiment.

In FIG. 5, the flow occurs between the Orchestrator 510, Configuration Management as a Service (CMaaS) 520, and Vendor Network Device/Function 530. A user creates and saves Configuration Templates and Telecom Details 522. Orchestrator triggers configuration with Dynamic Parameter Details 512. Trigger 514 is sent to the CMaaS 520 and includes Template IDs & OSS/Dynamic Parameter Values for generating the configuration. Based on saved templates, and data model schema files, an XML file for configuration is generated including JAR files and telecom library knowledge 524. Orchestrator 510 triggers CMaaS 520 for a configuration push 516. CMaaS 520 sends Configuration 526 to Vendor Network Device/Function 530. Network Device/Function 530 configures network functions/vendor devices with the generated Configuration 532.

Figure 6:
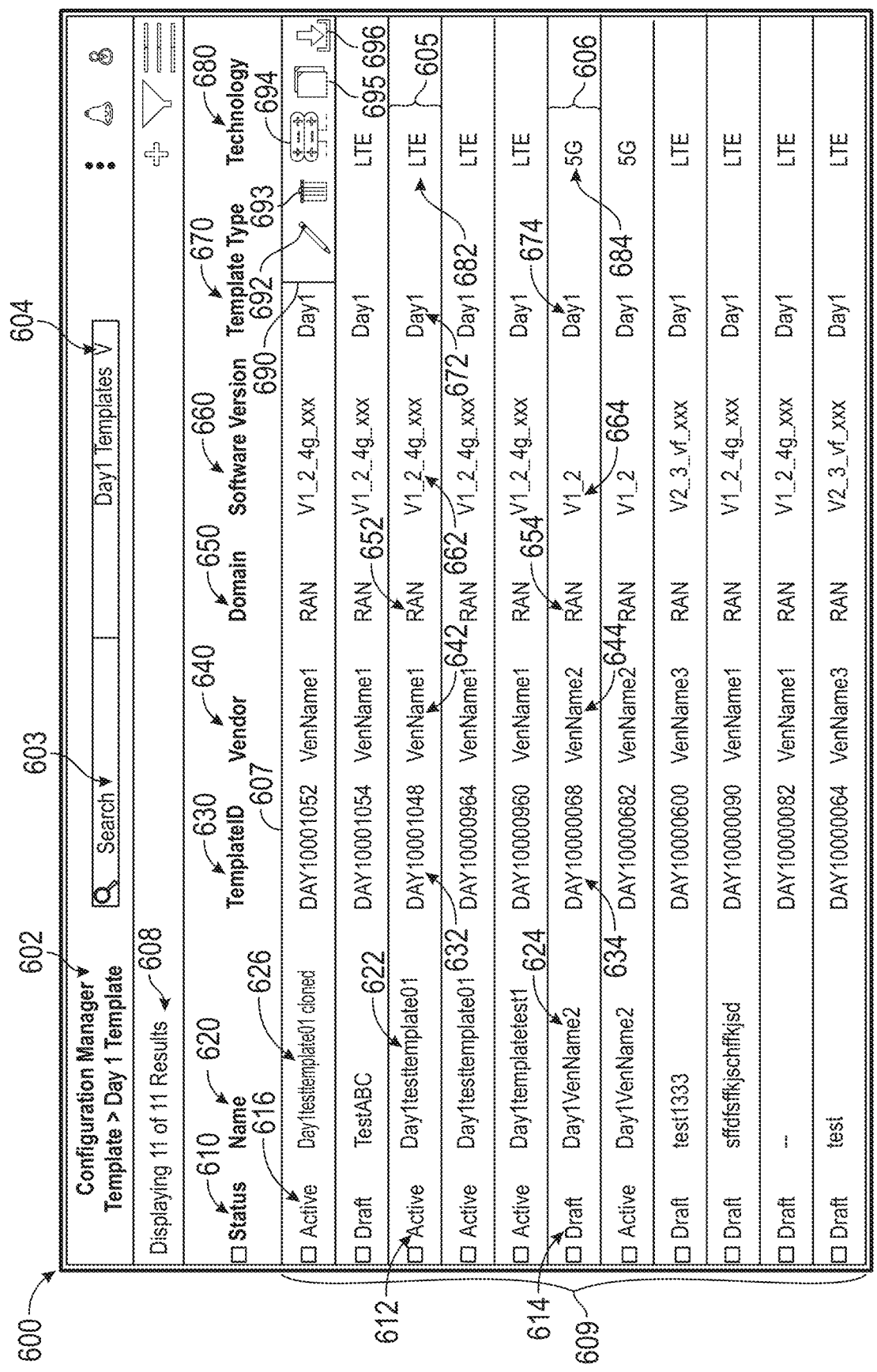
FIG. 6 is a Configuration Template User Interface according to at least one embodiment

FIG. 6 is a Configuration Template User Interface 600 according to at least one embodiment In FIG. 6, the Configuration Template User Interface 600 identifies Day1 Templates 602. The Configuration Template User Interface 600 includes a Search Window 603 and a Day1 Template Selection Icon 604. Results 608 based on the selection of the Day1 Templates 602 are displayed. In FIG. 6, the Configuration Template User Interface 600 shows 11 of 11 Day1 Templates 609. For a Day 1 Template 602, data associated with Status 610, Name 620, TemplateID 630, Vendor 640, Domain 650, Software Version 660, Template Type 670, and Technology 680 are presented.

A First Configuration Template 605 is shown having a Status 610 that is Active 612 and a Name 620 of Day1testtemplate01 622. The TemplateID 630 is identified as DAY10001048 632, Vendor 640 is identified as VenName1 642, Domain 650 is identified as RAN 652, Software Version 660 is identified as V1_2_4g_xxx 662, Template Type 670 is identified as Day1 672, and Technology 680 is identified as LTE 682.

A Second Configuration Template 606 is shown having a Status 610 that is Draft 614 and a Name 620 of Day1VenName2 624. The TemplateID 630 is identified as DAY10000068 634, Vendor 640 is identified as VenName2 644, Domain 650 is identified as RAN 654, Software Version 660 is identified as V1_2 664, Template Type 670 is identified as Day1 674, and Technology 680 is identified as LTE 684.

First Configuration Template 605 having Status 610 of Active 612 indicates the template having Name 620 of Day1testtemplate01 622 is now active. Second Configuration Template 606 having Status 610 of Draft 614 indicates template having Name 620 of Day1VenName2 624 has been created, but has not been submitted or associated with any Northbound Entity.

Configuration Template 607 is shown being selected and now has a Status 610 that is Active 616 and a Name 620 of Day1testtemplate01 cloned 626. Options 690 are shown available for selection by the user. The user is able to select Create Icon 692, Delete Icon 693, Association Icon 694, Details Icon 695, or Download Icon 696.

User is able to select Association Icon 694 to associate Configuration Template 607 having a Name 620 of Day1testtemplate01 cloned 626 with a Northbound Entity. In response to the user selecting the Association Icon 694, that template becomes Active, e.g., users submitted that template or finalizes the template so the template becomes active. Otherwise, the template is saved and a State 610 of Draft 614 is presented. State 610 of Draft 614 is for CMaaS and the template is not exposed to a Northbound Entity. Templates having a State 610 of Active 614 are exposed to Northbound Entities.

Figure 7:
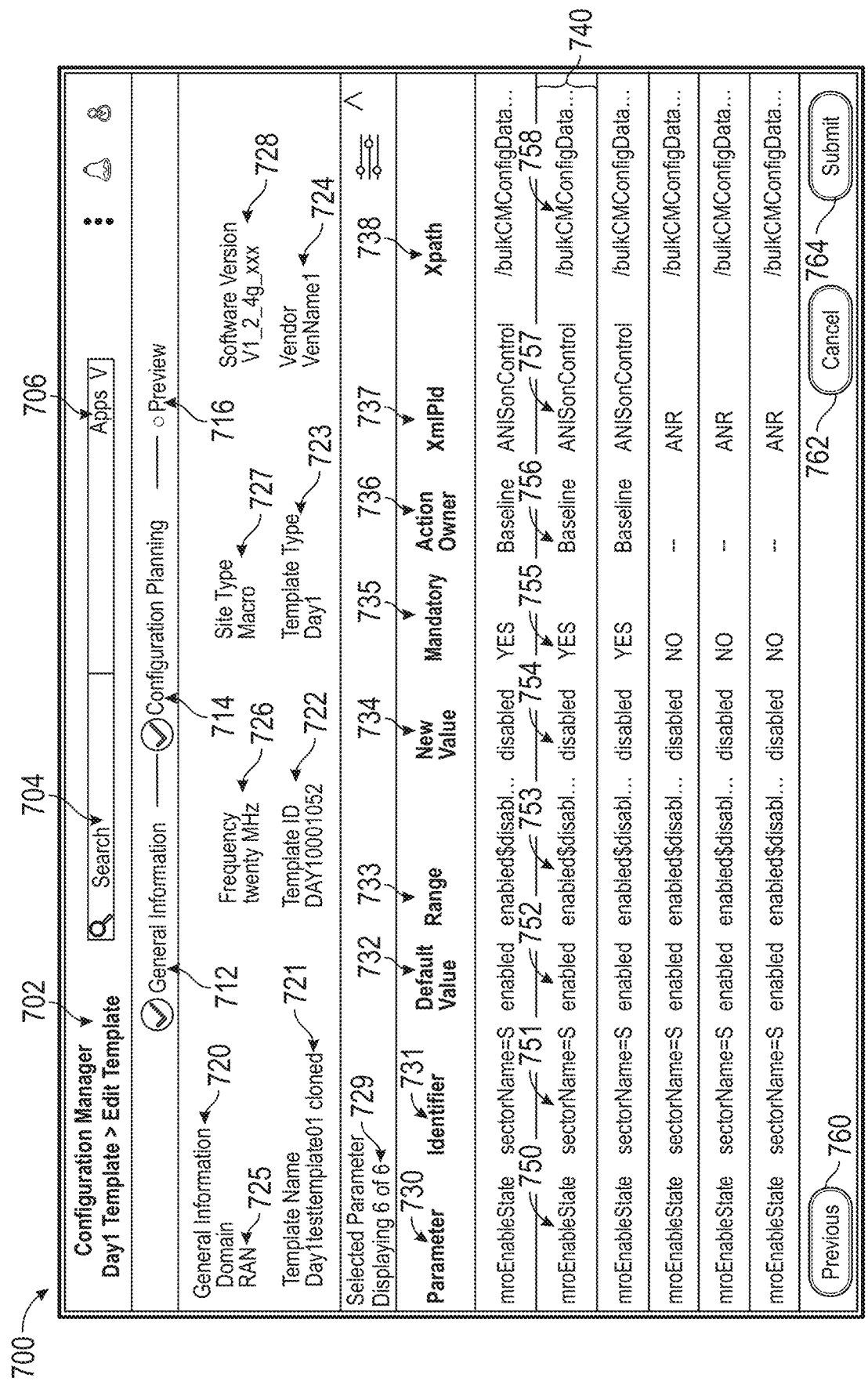
FIG. 7 is a Template Preview User Interface according to at least one embodiment.

FIG. 7 is a Template Preview User Interface 700 according to at least one embodiment.

In FIG. 7, Template Preview User Interface 700 presents data associated with a particular template. FIG. 7 indicates that the Template Preview User Interface 700 provides the user the ability to Edit 702 the template. Template Preview User Interface 700 includes a Search Window 704 and an Apps Selection Icon 706. The user is able to navigate from General Information 712, Configuration Planning 714, to Preview 716.

Information Window 720 includes a listing of General Information for a template, such as Configuration Template 607 selected in FIG. 6. Information Window 720 shows the template has a Template Name of Day1testtemplate01 cloned 721 and a Template ID of Day10001052 722. Information Window 720 shows the template has a Template Type is Day1 723, Vendor of VenName1 724, Domain of RAN 725, Frequency of twenty MHz 726, Site Type of Macro 727, and Software Version of V1_2_4g_xxx 728, which matches the information of Configuration Template 607 selected in FIG. 6. Information Window 720 includes a list of Selected Parameters of a total of six Parameters 729.

For the six Parameters 729, Information Window 720 presents data for Parameter 730, Identifier 731, Default Value 732, Range 733, New Value 734, Mandatory indication 735, Action Owner 736, XmlPld 737 identifying a device, and X Path 738 identifying a path for information. As an example, Information Window 720 presets data for Parameter 740 as follows. Parameter 730 has a value of mroEnableState 750, Identifier 731 is shown as sector-Name-S 751, Default Value 732 is shown as enabled 752, Range 733 is shown as "enabled$disabl . . . " 753, New Value 734 is shown as disabled 754, Mandatory indication 735 is shown as YES 755, Action Owner 736 is shown as Baseline 756, XmlPld 737 is shown as ANISonControl 757, and X Path 738 is shown as "/bulkCMConfiData . . . " 758.

From Template Preview User Interface 700, a user is able to select Previous 760 to step back changes, Cancel 762 to cancel the editing of the values for the template having Template Name of Day1testtemplate01 cloned 721 and a Template ID of Day10001052 722. The user is also able to select Submit 764 to lock in the parameter values for the template having Template Name of Day1testtemplate01 cloned 721 and a Template ID of Day10001052 722.

Figure 8:
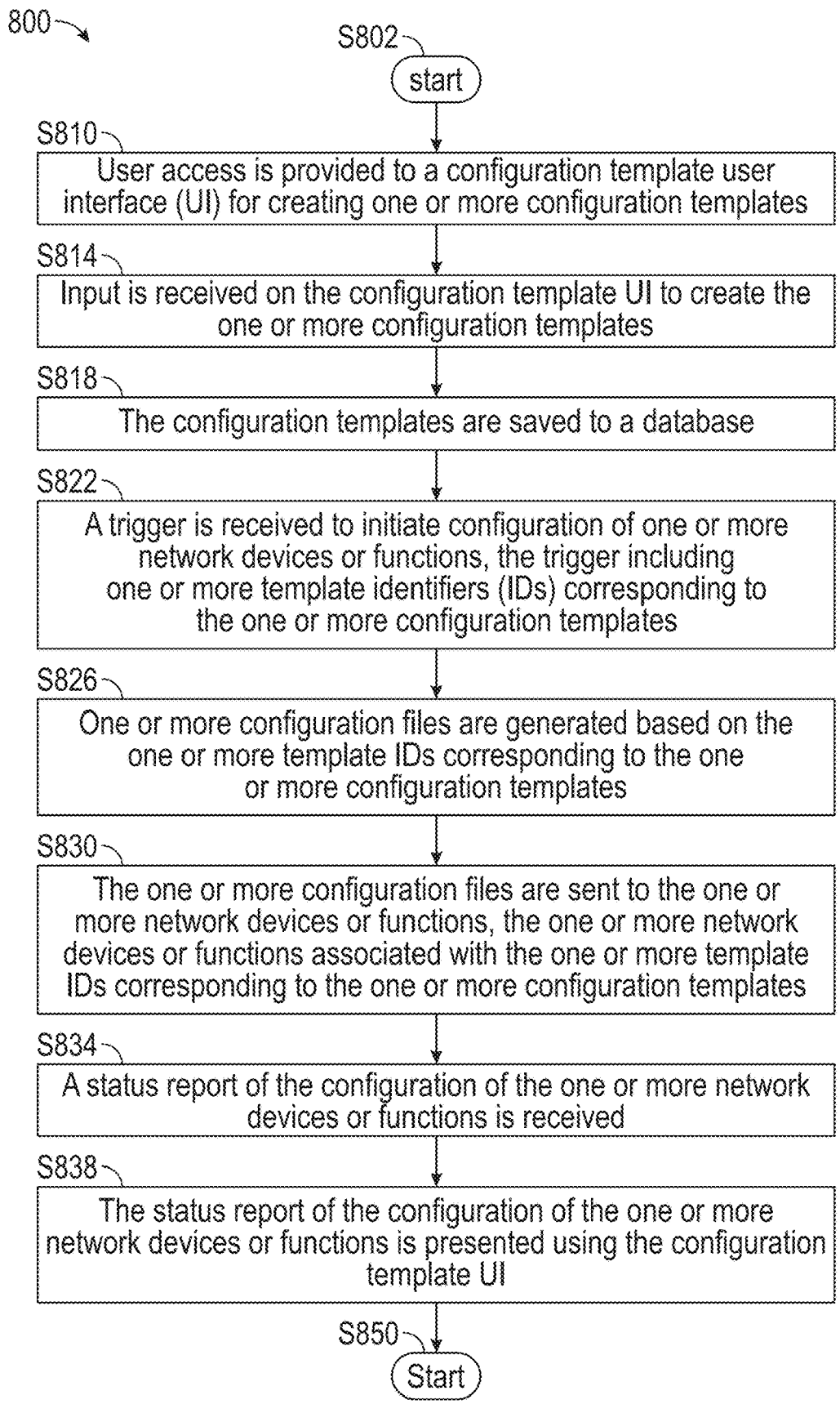
FIG. 8 is a flowchart of a method for automating provisioning of Day-1 Configuration Templates according to at least one embodiment.

FIG. 8 is a flowchart 800 of a method for automating provisioning of Day-1 Configuration Templates according to at least one embodiment.

In FIG. 8, the method starts S802 and user access is provided to a configuration template user interface (UI) for creating one or more configuration templates S810. The configuration template user interface (UI) presents a status associated with the one or more configuration templates of active or draft, wherein the presenting the status of active indicates a first of the one or more configuration templates has been associated with a northbound entity for configuring the network devices or network functions, and wherein the presenting the status of draft indicates a second of the one or more configuration templates has been created, but has not been has been associated with the northbound entity. The Configuration Template UI further includes a Template Preview UI, the Template Preview UI presents, for a selected one of the one or more configuration templates, a parameter, an identifier, an indication of default value as being enabled or disabled, a range, an indication of a new value as being enabled or disabled, and indication of whether a selection of all of the parameters is mandatory, an identification of an action owner, an XmlPld identifying a network device, and an X Path identifying a location of configuration data associated with the selected one of the one or more configuration templates. The Configuration Template UI is used to create one or more configuration templates by presenting a display of one or more configuration templates, the one or more configuration templates includes one or more of Status, Name, Template ID, Vendor, Domain, Software Version, Template Type, and Technology.

Input is received on the configuration template UI to create the one or more configuration templates S814. The input on the configuration template UI to create the one or more configuration templates includes edits to parameters of one or more existing configuration templates to create a new configuration template.

The configuration templates are saved to a database S818.

A trigger is received to initiate configuration of one or more network devices or functions, the trigger including one or more template identifiers (IDs) corresponding to the one or more configuration templates S822. The trigger further includes identification of OSS/Dynamic Parameters and Baseline parameter values, wherein the OSS/Dynamic Parameters and Baseline Parameter Values are used to generate at least one a JAR (Java ARchive) file, an XML (extensible Markup Language) file, or JavaScript Object Notation (JSON) file using at least one data model file obtained from a database based on the one or more template IDs.

One or more configuration files are generated based on the one or more template IDs corresponding to the one or more configuration templates S826.

The one or more configuration files are sent to the one or more network devices or functions, the one or more network devices or functions associated with the one or more template IDs corresponding to the one or more configuration templates S830.

A status report of the configuration of the one or more network devices or functions is received S834.

The status report of the configuration of the one or more network devices or functions is presented using the configuration template UI S838.

The process then terminates S850.

At least one embodiment of the method for automating provisioning of day-1 configuration templates includes providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

Figure 9:
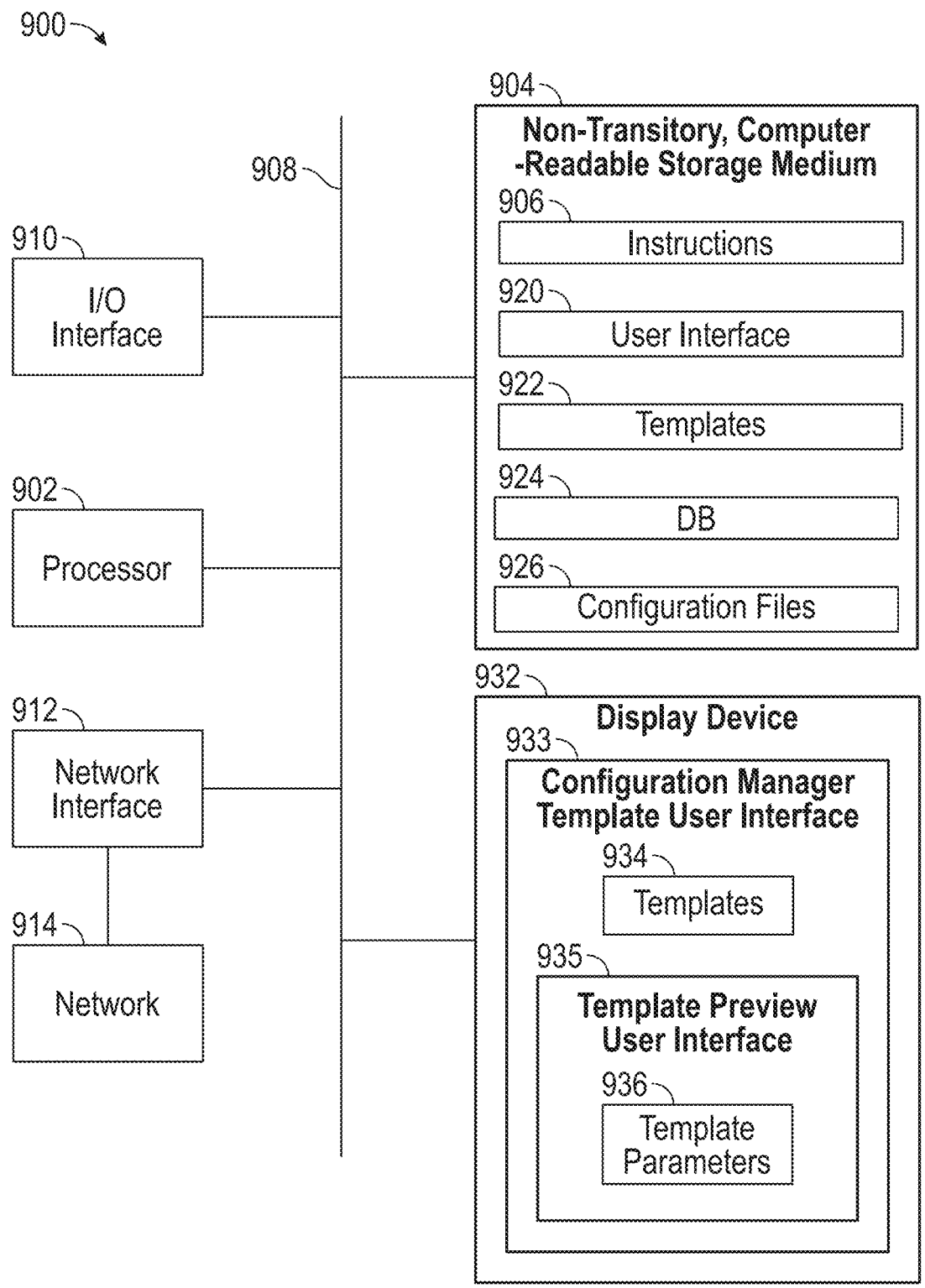
FIG. 9 is a high-level functional block diagram of a processor-based system according to at least one embodiment.

FIG. 9 is a high-level functional block diagram of a processor-based system 900 according to at least one embodiment.

In at least one embodiment, processing circuitry 900 automates provisioning of day-1 configuration templates. Processing circuitry 900 implements automating provisioning of day-1 configuration templates using Processor 902. Processing circuitry 900 also includes a Non-Transitory, Computer-Readable Storage Medium 904 that is used to automate provisioning of day-1 configuration templates. Non-Transitory, Computer-Readable Storage Medium 904, amongst other things, is encoded with, i.e., stores, Instructions 906, i.e., computer program code that are executed by Processor 902 causes Processor 902 to perform operations for automating provisioning of day-1 configuration templates. Execution of Instructions 906 by Processor 902 represents (at least in part) an application which implements at least a portion of the methods described herein in accordance with one or more embodiments (hereinafter, the noted processes and/or methods).

Processor 902 is electrically coupled to Non-Transitory, Computer-Readable Storage Medium 904 via a Bus 908. Processor 902 is electrically coupled to an Input/output (I/O) Interface 910 by Bus 908. A Network Interface 912 is also electrically connected to Processor 902 via Bus 908. Network Interface 912 is connected to a Network 914, so that Processor 902 and Non-Transitory, Computer-Readable Storage Medium 904 connect to external elements via Network 914. Processor 902 is configured to execute Instructions 906 encoded in Non-Transitory, Computer- Readable Storage Medium 904 to cause Processing Circuitry 900 to be usable for performing at least a portion of the processes and/or methods. In one or more embodiments, Processor 902 is a Central Processing Unit (CPU), a multi-processor, a distributed processing system, an Application Specific Integrated Circuit (ASIC), and/or a suitable processing unit.

Processing circuitry 900 includes I/O Interface 910. I/O Interface 910 is coupled to external circuitry. In one or more embodiments, I/O Interface 910 includes a keyboard, keypad, mouse, trackball, trackpad, touchscreen, and/or cursor direction keys for communicating information and commands to Processor 902.

Processing circuitry 900 also includes Network Interface 912 coupled to Processor 902. Network Interface 912 allows processing circuitry 900 to communicate with Network 914, to which one or more other computer systems are connected. Network Interface 912 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 900 is configured to receive information through I/O Interface 910. The information received through I/O Interface 910 includes one or more of instructions, data, design rules, libraries of cells, and/or other parameters for processing by Processor 902. The information is transferred to Processor 902 via Bus 908. Processing circuitry 900 is configured to receive information related to User Interfaces, such as Configuration Manager Template User Interface 933 and Template Preview User Interface 935, through I/O Interface 910. The information is stored in Non-Transitory, Computer-Readable Storage Medium 904 as UI 920. Processor 902 executes Instructions 906 from Non-Transitory, Computer-Readable Storage Medium 904 to perform operations including providing user access to a Configuration Template User Interface (UI) for creating one or more configuration templates, receiving input on the Configuration Template UI to create the one or more configuration templates, saving the configuration templates to a database, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, sending the one or more configuration files to the one or more network devices or functions, the one or more network devices or functions associated with the one or more Template IDs corresponding to the one or more configuration templates, receiving a status report of the configuration of the one or more network devices or functions, and presenting the status report of the configuration of the one or more network devices or functions using the Configuration Template UI. The trigger further includes identification of OSS/Dynamic Parameters and Baseline parameter values, wherein the OSS/Dynamic Parameters and Baseline parameter values are used to generate at least one a JAR (Java ARchive) file, an XML (extensible Markup Language) file, or JavaScript Object Notation (JSON) file using at least one data model file obtained from a database based on the one or more Template IDs.

Processor 902 is further configured to present a Status of Active or Draft on the Configuration Template UI, wherein the status of active indicates a first of the one or more configuration templates has been associated with a northbound entity for configuring the one or more network devices or network functions, and wherein the status of draft indicates a second of the one or more configuration templates has been created, but has not been has been associated with the northbound entity. Processor 902 presents, on Configuration Template UI, a display of one or more configuration templates, the display of the one or more configuration templates includes one or more of Status, Name, Template ID, Vendor, Domain, Software Version, Template Type, and Technology.

Processor 902 executes Instructions 906 from Non-Transitory, Computer-Readable Storage Medium 904 to provide user access to the Configuration Template UI by presenting a Template Preview UI, the Template Preview UI includes, for a selected one of the one or more configuration templates, a parameter, an identifier, an indication of default value as being enabled or disabled, a range, an indication of a new value as being enabled or disabled, and indication of whether a selection of all of the parameters is mandatory, an identification of an action owner, an XmlPld identifying the one or more network devices, and an X Path identifying a location of configuration data associated with the selected one of the one or more configuration templates. Processor 9012 receives input on the Configuration Template UI to create the one or more configuration templates by receiving edits to parameters of one or more existing configuration templates to create a new configuration template.

In one or more embodiments, one or more Non-Transitory, Computer-Readable Storage Medium 904 having stored thereon instructions (in compressed or uncompressed form) that may be used to program a computer, processor, or other electronic device) to perform processes or methods described herein. The one or more Non-Transitory, Computer-Readable Storage Medium 904 include one or more of an electronic storage medium, a magnetic storage medium, an optical storage medium, a quantum storage medium, or the like.

For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory, Computer-Readable Storage Medium 904 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 904 stores computer Instruction 906 configured to cause Processor 902 to perform at least a portion of the processes and/or methods for automating provisioning of day-1 configuration templates. In one or more embodiments, Non-Transitory, Computer-Readable Storage Medium 904 also implements a Database (DB) 924, and stores information, such as Templates 922, Configuration Files 926, which facilitate performing at least a portion of the processes and/or methods for automating provisioning of day-1 configuration templates.

Accordingly, in at least one embodiment, Processor 902 executes Instructions 906 stored on the one or more Non-Transitory, Computer-Readable Storage Medium 904 to display Templates 934 on Display Device 932 using Configuration Manager Template User Interface 933 and to display Template Parameters 936 on a Template Preview User Interface 935 provided by Configuration Manager Template User Interface 933.

Embodiments described herein provide a method that provides one or more advantages. For example, the manual effort of updating the parameter values is eliminated. Manually provisioning Day 1 configuration templates is highly tedious and prone to human error. Time and money are also saved. Automating provisioning of Day 1 configuration templates also saves time and money because the configuration flow is not interrupted and is more efficient.

In a method according to at least one embodiment, a method for automating provisioning of Day-1 configuration templates includes providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

In a method according to at least one embodiment, the method further includes saving the configuration templates to a database, receiving a status report of the configuration of the one or more network devices or functions, and presenting the status report of the configuration of the one or more network devices or functions using the Configuration Template UI.

In a method according to at least one embodiment, the providing user access to the Configuration Template UI further includes presenting a status associated with the one or more configuration templates of active or draft, wherein the presenting the status of active indicates a first of the one or more configuration templates has been associated with a northbound entity for configuring the network devices or network functions, and wherein the presenting the status of draft indicates a second of the one or more configuration templates has been created, but has not been has been associated with the northbound entity.

In a method according to at least one embodiment, the providing user access to the Configuration Template UI further includes presenting a Template Preview UI, the presenting the Template Preview UI includes presenting, for a selected one of the one or more configuration templates, a parameter, an identifier, an indication of default value as being enabled or disabled, a range, an indication of a new value as being enabled or disabled, and indication of whether a selection of all of the parameters is mandatory, an identification of an action owner, an XmlPld identifying a network device, and an X Path identifying a location of configuration data associated with the selected one of the one or more configuration templates.

In a method according to at least one embodiment, the receiving the input on the Configuration Template UI to create the one or more configuration templates includes receiving edits to parameters of one or more existing configuration templates to create a new configuration template.

In a method according to at least one embodiment, the receiving the trigger further includes receiving identification of OSS/Dynamic Parameters and Baseline parameter values, wherein the OSS/Dynamic Parameters and Baseline Parameter Values are used to generate at least one a JAR (Java ARchive) file, an XML (extensible Markup Language) file, or JavaScript Object Notation (JSON) file using at least one data model file obtained from a database based on the one or more Template IDs.

In a method according to at least one embodiment, the providing user access to the Configuration Template UI for creating one or more configuration templates includes presenting a display of one or more configuration templates, the presenting the display of the one or more configuration templates includes presenting one or more of Status, Name, Template ID, Vendor, Domain, Software Version, Template Type, and Technology.

In at least one embodiment, a configuration manager includes a memory storing computer-readable instructions, and a processor connected to the memory, wherein the processor is configured to execute the computer-readable instructions to perform operations including providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

In a system according to at least one embodiment, the processor is further configured to save the configuration templates to a database, receive a status report of the configuration of the one or more network devices or functions, and present the status report of the configuration of the one or more network devices or functions using the Configuration Template UI.

In a system according to at least one embodiment, the processor is further configured to present a status associated with the one or more configuration templates of active or draft, wherein the presenting the status of active indicates a first of the one or more configuration templates has been associated with a northbound entity for configuring the network devices or network functions, and wherein the presenting the status of draft indicates a second of the one or more configuration templates has been created, but has not been has been associated with the northbound entity.

In a system according to at least one embodiment, the processor is further configured to provide user access to the configuration template user interface (UI) by presenting a Template Preview UI, the Template Preview UI includes, for a selected one of the one or more configuration templates, a parameter, an identifier, an indication of default value as being enabled or disabled, a range, an indication of a new value as being enabled or disabled, and indication of whether a selection of all of the parameters is mandatory, an identification of an action owner, an XmlPld identifying a network device, and an X Path identifying a location of configuration data associated with the selected one of the one or more configuration templates.

In a system according to at least one embodiment, the processor is further configured to receive the input on the Configuration Template UI to create the one or more configuration templates by receiving edits to parameters of one or more existing configuration templates to create a new configuration template.

In a system according to at least one embodiment, the trigger further includes identification of OSS/Dynamic Parameters and Baseline parameter values, wherein the OSS/Dynamic Parameters and Baseline parameter values are used to generate at least one a JAR (Java ARchive) file, an XML (extensible Markup Language) file, or JavaScript Object Notation (JSON) file using at least one data model file obtained from a database based on the one or more Template IDs.

In a system according to at least one embodiment, the processor is further configured to provide user access to the Configuration Template UI for creating one or more configuration templates by presenting a display of one or more configuration templates, the display of the one or more configuration templates includes one or more of Status, Name, Template ID, Vendor, Domain, Software Version, Template Type, and Technology.

In at least one embodiment, a non-transitory computer-readable media having computer-readable instructions stored thereon, which when executed by a processor causes the processor to perform operations including providing user access to a configuration template user interface (UI) for creating one or more configuration templates, receiving input on the Configuration Template UI to create the one or more configuration templates, receiving a trigger to initiate configuration of one or more network devices or functions, the trigger including one or more Template Identifiers (IDs) corresponding to the one or more configuration templates, generating one or more configuration files based on the one or more Template IDs corresponding to the one or more configuration templates, and sending the one or more configuration files to the one or more network devices or functions, the one or more network devices or functions associated with the one or more Template IDs corresponding to the one or more configuration templates.

In a non-transitory computer-readable media according to at least one embodiment, the operations further include saving the configuration templates to a database, receiving a status report of the configuration of the one or more network devices or functions, and presenting the status report of the configuration of the one or more network devices or functions using the Configuration Template UI.

In a non-transitory computer-readable media according to at least one embodiment, the providing user access to the Configuration Template UI further includes presenting a status associated with the one or more configuration templates of active or draft, wherein the presenting the status of active indicates a first of the one or more configuration templates has been associated with a northbound entity for configuring the network devices or network functions, and wherein the presenting the status of draft indicates a second of the one or more configuration templates has been created, but has not been has been associated with the northbound entity.

In a non-transitory computer-readable media according to at least one embodiment, the providing user access to the Configuration Template UI further includes presenting a Template Preview UI, the presenting the Template Preview UI includes presenting, for a selected one of the one or more configuration templates, a parameter, an identifier, an indication of default value as being enabled or disabled, a range, an indication of a new value as being enabled or disabled, and indication of whether a selection of all of the parameters is mandatory, an identification of an action owner, an XmlPld identifying a network device, and an X Path identifying a location of configuration data associated with the selected one of the one or more configuration templates, and wherein the receiving input on the Configuration Template UI to create the one or more configuration templates includes receiving edits to parameters of one or more existing configuration templates to create a new configuration template.

In a non-transitory computer-readable media according to at least one embodiment, the receiving the trigger further includes receiving identification of OSS/Dynamic Parameters and Baseline parameter values, wherein the OSS/Dynamic Parameters and Baseline parameter values are used to generate at least one a JAR (Java ARchive) file, an XML (extensible Markup Language) file, or JavaScript Object Notation (JSON) file using at least one data model file obtained from a database based on the one or more Template IDs.

In a non-transitory computer-readable media according to at least one embodiment, the providing user access to the Configuration Template UI for creating one or more configuration templates includes presenting a display of one or more configuration templates, the presenting the display of the one or more configuration templates includes presenting one or more of Status, Name, Template ID, Vendor, Domain, Software Version, Template Type, and Technology.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for automating provisioning of configuration templates, comprising:
providing user access to a Configuration Template User Interface (UI) for creating one or more configuration templates,
wherein the providing user access to the Configuration Template UI further includes presenting a status associated with the one or more configuration templates of active or draft, wherein the presenting the status of active indicates a first of the one or more configuration templates has been associated with a northbound entity for configuring one or more network devices or network functions, and wherein the presenting the status of draft indicates a second of the one or more configuration templates has been created, but has not been has been associated with the northbound entity;
receiving input on the Configuration Template UI to create the one or more configuration templates;
receiving a trigger to initiate configuration of the one or more network devices or functions, the trigger including one or more Template Identifiers (IDs) corresponding to the one or more configuration templates;

generating one or more configuration files based on the one or more Template IDs corresponding to the one or more configuration templates; and sending the one or more configuration files to the one or more network devices or functions, the one or more network devices or functions associated with the one or more Template IDs corresponding to the one or more configuration templates.

2. The method of claim 1, further comprising:
saving the configuration templates to a database;
receiving a status report of the configuration of the one or more network devices or functions; and
presenting the status report of the configuration of the one or more network devices or functions using the Configuration Template UI.

3. The method of claim 1, wherein the providing user access to the Configuration Template UI further includes presenting a Template Preview UI, the presenting the Template Preview UI includes presenting, for a selected one of the one or more configuration templates, a parameter, an identifier, an indication of default value as being enabled or disabled, a range, an indication of a new value as being enabled or disabled, an indication of whether a selection of all of the parameters is mandatory, an identification of an action owner, an XmlPld identifying the one or more network devices, and an X Path identifying a location of configuration data associated with the selected one of the one or more configuration templates.

4. The method of claim 3, wherein the receiving the input on the Configuration Template UI to create the one or more configuration templates includes receiving edits to parameters of one or more existing configuration templates to create a new configuration template.

5. The method of claim 1, wherein the receiving the trigger further includes receiving identification of OSS/Dynamic Parameters and Baseline parameter values, wherein the OSS/Dynamic Parameters and Baseline Parameter Values are used to generate at least one a JAR (Java ARchive) file, an XML (extensible Markup Language) file, or JavaScript Object Notation (JSON) file using at least one data model file obtained from a database based on the one or more Template IDs.

6. The method of claim 1, wherein the providing user access to the Configuration Template UI for creating one or more configuration templates includes presenting a display of one or more configuration templates, the presenting the display of the one or more configuration templates includes presenting one or more of the Status, Name, Template ID, Vendor, Domain, Software Version, Template Type, and Technology.

7. A configuration manager, comprising:
a memory storing computer-readable instructions; and
a processor connected to the memory, wherein the processor is configured to execute the computer-readable instructions to perform operations including:
providing user access to a Configuration Template User Interface (UI) for creating one or more configuration templates,
wherein the processor is further configured to present one or more status associated with the one or more configuration templates by presenting a Status of Active or Draft, wherein the status of active indicates a first of the one or more configuration templates has been associated with a northbound entity for configuring one or more network devices or network functions, and wherein the status of draft indicates a second of the one or more configuration templates has been created, but has not been has been associated with the northbound entity;
receiving input on the Configuration Template UI to create the one or more configuration templates;
receiving a trigger to initiate configuration of the one or more network devices or functions, the trigger including one or more Template Identifiers (IDs) corresponding to the one or more configuration templates;
generating one or more configuration files based on the one or more Template IDs corresponding to the one or more configuration templates; and
sending the one or more configuration files to the one or more network devices or functions, the one or more network devices or functions associated with the one or more Template IDs corresponding to the one or more configuration templates.

8. The configuration manager of claim 7, wherein the processor is further configured to:
save the configuration templates to a database;
receive a status report of the configuration of the one or more network devices or functions; and
present the status report of the configuration of the one or more network devices or functions using the Configuration Template UI.

9. The configuration manager of claim 7, wherein the processor is further configured to provide user access to the Configuration Template User Interface (UI) by presenting a Template Preview UI, the Template Preview UI includes, for a selected one of the one or more configuration templates, a parameter, an identifier, an indication of default value as being enabled or disabled, a range, an indication of a new value as being enabled or disabled, and indication of whether a selection of all of the parameters is mandatory, an identification of an action owner, an XmlPld identifying the one or more network devices, and an X Path identifying a location of configuration data associated with the selected one of the one or more configuration templates.

10. The configuration manager of claim 9, wherein the processor is further configured to receive the input on the Configuration Template UI to create the one or more configuration templates by receiving edits to parameters of one or more existing configuration templates to create a new configuration template.

11. The configuration manager of claim 7, wherein the trigger further includes identification of OSS/Dynamic Parameters and Baseline parameter values, wherein the OSS/Dynamic Parameters and Baseline parameter values are used to generate at least one a JAR (Java ARchive) file, an XML (extensible Markup Language) file, or JavaScript Object Notation (JSON) file using at least one data model file obtained from a database based on the one or more Template IDs.

12. The configuration manager of claim 7, wherein the processor is further configured to provide user access to the Configuration Template UI for creating one or more configuration templates by presenting a display of one or more configuration templates, the display of the one or more configuration templates includes one or more of the Status, Name, Template ID, Vendor, Domain, Software Version, Template Type, and Technology.

13. A non-transitory computer-readable media having computer-readable instructions stored thereon, which when executed by a processor causes the processor to perform operations comprising:

providing user access to a Configuration Template User Interface (UI) for creating one or more configuration templates,
  wherein the providing user access to the Configuration Template UI further includes presenting a status associated with the one or more configuration templates of active or draft, wherein the presenting the status of active indicates a first of the one or more configuration templates has been associated with a northbound entity for configuring one or more network devices or network functions, and wherein the presenting the status of draft indicates a second of the one or more configuration templates has been created, but has not been has been associated with the northbound entity;
receiving input on the Configuration Template UI to create the one or more configuration templates;
receiving a trigger to initiate configuration of the one or more network devices or functions, the trigger including one or more Template Identifiers (IDs) corresponding to the one or more configuration templates;
generating one or more configuration files based on the one or more Template IDs corresponding to the one or more configuration templates; and
sending the one or more configuration files to the one or more network devices or functions, the one or more network devices or functions associated with the one or more Template IDs corresponding to the one or more configuration templates.

14. The non-transitory computer-readable media of claim 13 further comprises:
saving the configuration templates to a database;
receiving a status report of the configuration of the one or more network devices or functions; and
presenting the status report of the configuration of the one or more network devices or functions using the Configuration Template UI.

15. The non-transitory computer-readable media of claim 13, wherein the providing user access to the Configuration Template UI further includes presenting a Template Preview UI, the presenting the Template Preview UI includes presenting, for a selected one of the one or more configuration templates, a parameter, an identifier, an indication of default value as being enabled or disabled, a range, an indication of a new value as being enabled or disabled, an indication of whether a selection of all of the parameters is mandatory, an identification of an action owner, an XmlPld identifying the one or more network devices, and an X Path identifying a location of configuration data associated with the selected one of the one or more configuration templates, and wherein the receiving input on the Configuration Template UI to create the one or more configuration templates includes receiving edits to parameters of one or more existing configuration templates to create a new configuration template.

16. The non-transitory computer-readable media of claim 13, wherein the receiving the trigger further includes receiving identification of OSS/Dynamic Parameters and Baseline parameter values, wherein the OSS/Dynamic Parameters and Baseline parameter values are used to generate at least one a JAR (Java ARchive) file, an XML (extensible Markup Language) file, or JavaScript Object Notation (JSON) file using at least one data model file obtained from a database based on the one or more Template IDs.

17. The non-transitory computer-readable media of claim 13, wherein the providing user access to the Configuration Template UI for creating one or more configuration templates includes presenting a display of one or more configuration templates, the presenting the display of the one or more configuration templates includes presenting one or more of the Status, Name, Template ID, Vendor, Domain, Software Version, Template Type, and Technology.

* * * * *